United States Patent [19]
Nagai

[11] 3,981,473
[45] Sept. 21, 1976

[54] LOCKING DEVICE FOR ADJUSTABLE SEAT TRACK STRUCTURE

[75] Inventor: Tsuyoshi Nagai, Toyota, Japan

[73] Assignee: Arakawashatai Kogyo Kabushiki Kaisha, Toyota, Japan

[22] Filed: May 9, 1975

[21] Appl. No.: 575,990

[30] Foreign Application Priority Data
Jan. 28, 1975   Japan.............................. 50-11553

[52] U.S. Cl.................................. 248/430; 74/527
[51] Int. Cl.²......................................... F16M 13/00
[58] Field of Search ............ 74/527, 529, 530, 533, 74/536, 578; 248/393, 419, 420, 424, 429, 430; 296/65 R

[56] References Cited
UNITED STATES PATENTS

| 872,247 | 11/1907 | Moss............................... 248/429 X |
| 2,667,912 | 2/1954 | McCormick....................... 248/430 |
| 2,713,384 | 7/1955 | Rosenberg......................... 248/430 |
| 3,381,927 | 5/1968 | Stamates........................... 248/429 |
| 3,661,352 | 5/1972 | McFarlane......................... 248/429 |
| 3,866,876 | 2/1975 | Adams............................... 248/429 |

FOREIGN PATENTS OR APPLICATIONS

| 1,077,081 | 7/1967 | United Kingdom............... 296/65 R |
| 9,416 | 4/1897 | United Kingdom................ 248/429 |

Primary Examiner—Lawrence J. Staab
Attorney, Agent, or Firm—Berman, Aisenberg & Platt

[57] ABSTRACT

A locking device for an adjustable seat track structure comprises an elongated lock plate secured under the stationary track of the seat track structure and provided thereon with continuous teeth with a predetermined pitch to be transversely arranged against the stationary track, and a latch member operatively supported by a rotary member assembled with the movable track of the seat track structure to be moved toward and apart from the lock plate due to the rotary movement of the rotary member and including thereon a lateral latch element to be engaged and disengaged with the continuous teeth of the lock plate by movement of the latch member.

5 Claims, 5 Drawing Figures

LOCKING DEVICE FOR ADJUSTABLE SEAT TRACK STRUCTURE

BACKGROUND OF THE INVENTION

The present invention relates to a seat track structure for adjusting a vehicle seat fore and aft and locking the seat in a selected position, and more particularly to an improved locking device for the adjustable seat track structure of the mentioned type.

In a conventional locking device for a seat track structure, the lock plate is commonly made of sheet metal and the pitch of the locking holes cannot be designed smaller than 20mm due to the thickness of the lock plate. This makes fine adjustments of the locked position of the seat track structure impossible so that the passenger cannot obtain the most proper attitude.

Some conventional seat track structure have been introduced, which are provided with locking devices for stepless adjustments of the locked positions of the seat track structures. Such locking devices are, however, much complicated constructionally and not proper for practical use.

SUMMARY OF THE INVENTION

The primary object of the present invention is, therefore, to provide an improved locking device for an adjustable seat track structure, wherein the locking device is designed to enable fine adjustment of the locked positions of the seat track structure and the locking device is of a simple construction yet with good durability and long life.

Another object of the present invention is to provide an improved locking device for an adjustable seat track structure, having the above mentioned characteristics, wherein the locking device is easily interlocked with such other adjusting devices as a conventional reclining device.

According to the present invention, a locking device for an adjustable seat track structure comprises an elongated lock plate secured under the stationary track of the seat track structure and provided thereon with continuous teeth with a predetermined pitch to be transversely arranged against the stationary track, a U-shaped supporting member secured on the movable track of the seat track structure and including a pair of legs extending therefrom adjacent to the both sides of the stationary track, a U-shaped latch member provided thereon with a lateral latch element to be located under the lock plate and engaged with a selected portion of the continuous teeth, a U-shaped rotary member pivoted at its both arms to the legs of the supporting member, the bottom portion of the rotary member being arranged to be located under the latch element of the latch member and one of the arms having an operation handle, interlocking means for supporting the latch member so that the lateral latch element is located under the lock plate a selected distance and for moving the latch member toward and apart from the lock plate due to rotary movement of the rotary member to engage and disengage the latch element with the continuous teeth of the lock plate, and resilient means for biasing the rotary member to maintain the engagement of the latch element with the continuous teeth.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
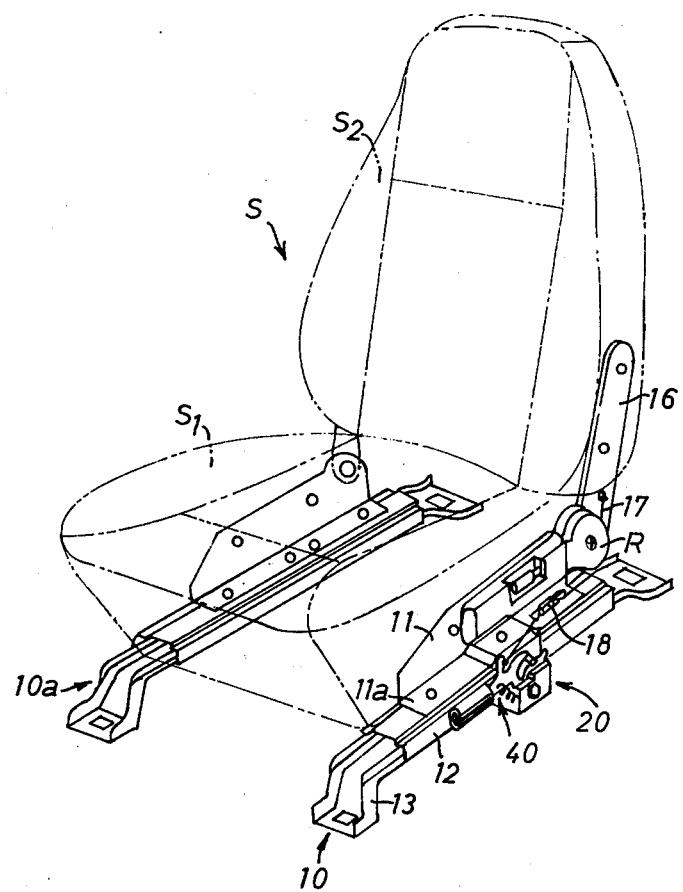
FIG. 1 illustrates a single passenger seat of the bucket type which is provided with a pair of adjustable seat track structures, one of the seat track structure including a locking device according to the present invention.

Now referring to the accompanying drawings, FIG. 1 illustrates a single passenger seat $s$ of the bucket type which is provided with a pair of conventional seat track structures 10 and 10a. The seat track structure 10 includes an upper or movable elongated track 12 secured longitudinally on the bottom portion of the left side of the seat cushion $s_1$ of the passenger seat $s$ by way of an L-shaped bracket 11 and a lower or stationary elongated track 13 secured on the floor of the vehicle compartment to slidably support the movable track 12 thereon. The seat track structure 10 is provided with a locking device 20 which is assembled substantially on the longitudinal center of the movable track 12 to lock the movable track 12 on the stationary track 13 at the desired position. The seat back $s_2$ of the passenger seat $s$ is locked in its selected reclining position by a conventional reclining device R which is installed on the left side of the seat cushion $s_1$.

Figure 2:
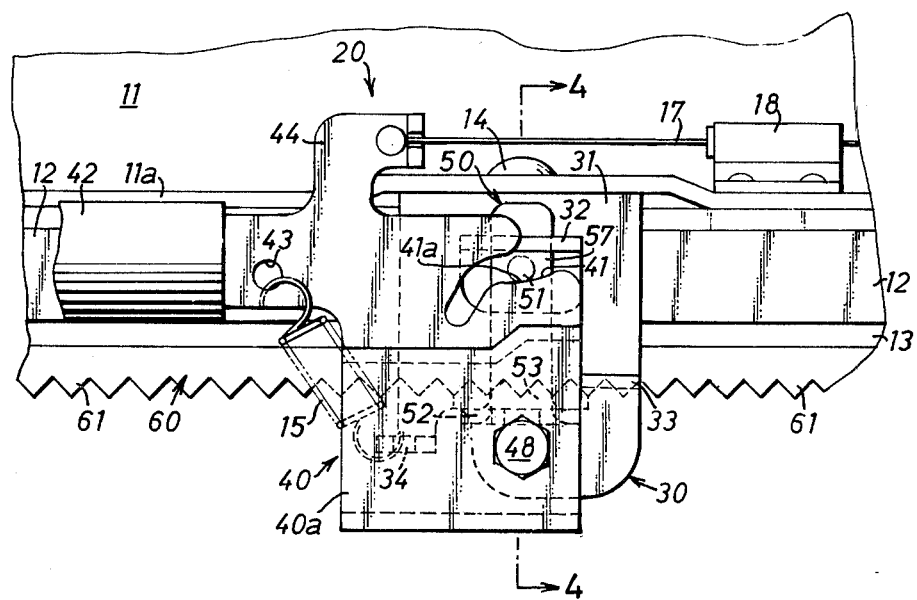
FIG. 2 is an enlarged side view of the locking device of FIG. 1, wherein the locking device is in the locked position.
Figure 4:
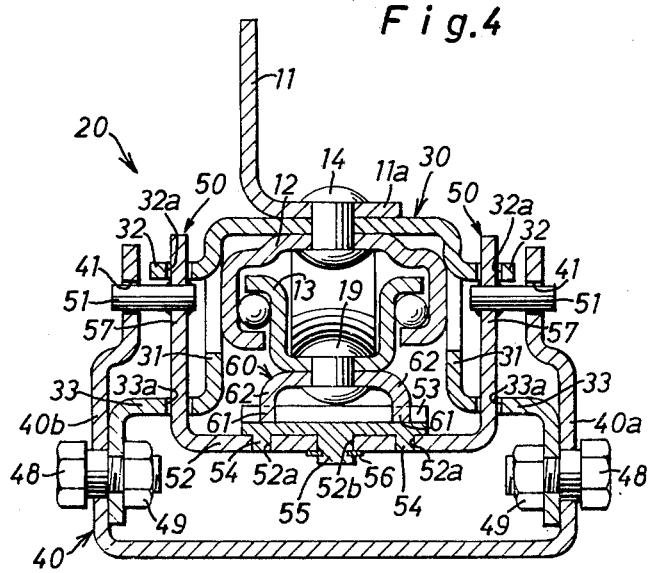
FIG. 4 is a vertical cross-sectional view of the locking device taken along line 4—4 of FIG. 2.
Figure 3:
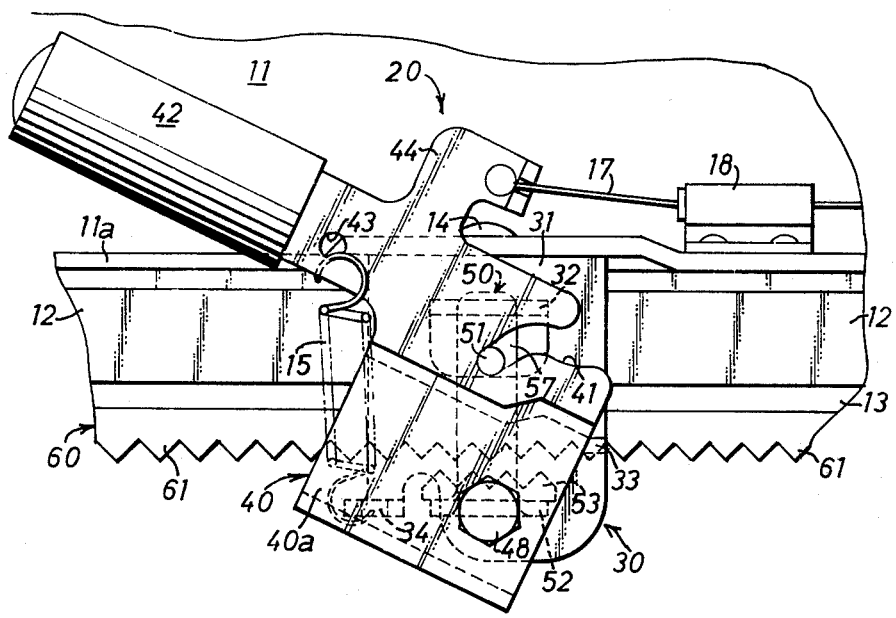
FIG. 3 is an enlarged side view of the locking device of FIG. 1, wherein the locking device is in the unlocked position.

As well shown in FIGS. 2, 3 and 4, the locking device 20 includes a supporting bracket 30 secured on the movable track 12 substantially at the longitudinal center thereof and a rotary member 40 journalled swingably on a pair of legs 31, 31 of the supporting bracket 30. The locking device 20 further includes a latch member 50 supported at its both arms by the rotary member 40 through a pair of sliding pins 51, 51 and a lock plate 60 secured longitudinally on the bottom face of the stationary track 13.

The supporting bracket 30 has a substantially U-shaped cross-section, as best shown in FIG. 4. The supporting bracket 30 is interposed at the head portion thereof between a horizontal flange 11a of the bracket 11 and the upper face of the movable track 12 and clamped by a rivet 14 and is integrally provided at its upper portion with a pair of outwardly extending arms 32, 32. The arms 32, 32 are provided respectively with upper guide holes 32a, 32a, corresponding with the lower guide holes 33a, 33a provided on a pair of outwardly bent portions 33, 33 of the supporting bracket 30 respectively.

The rotary member 40 has a substantially U-shaped cross-section, as best shown in FIG. 4, and is swingably journalled at the both sides thereof on the legs 31, 31 of the supporting bracket 30 by way of stepped bolts 48, 48 and nuts 49, 49. This rotary member 40 is provided at the respective upstanding portions 40a, 40b thereof with a pair of cam slots 41, 41 engaged with the sliding pins 51, 51. A hand lever 42 is formed integrally with the front end of the vertical portion 40a of the rotary member 40 and is biased counterclockwise by a tension coil spring 15 which is stretched between a hole 43 drilled through the stem of the hand lever 42 and an inwardly-bent tab 34 integral with the bottom end of the supporting bracket 30. With a projection 44 extended upwardly from the stem of the hand lever 42, connected is a flexible cable 17 which is fixed at its other end with a hinge plate 16 of the seat back $s_2$ through a guide member 18 secured on the flange 11a of the bracket 11. Thus, when the cable 17 is pulled due to forward reclination of the seat back $s_2$, the rotary member 40 is forcibly rotated clockwise against biasing force of the spring 15.

The latch member 50 has a U-shaped cross-section and a transversely toothed element 53 secured thereon to be meshed with a pair of toothed portions 61 of the lock plate 60. The toothed element 53 is provided integrally with downward projections 54, 54 which are engaged with holes 52a, 52a bored on the horizontal portion 52 of the latch member 50. The toothed element 53 is further provided with a central boss 55 which is engaged with a hole 52b drilled on the center of the horizontal portion 52 of the latch member 50 and is fixed by a snap ring 56. Both arms 57, 57 of the latch member 50 are extended upwardly through the lower guide holes 33a, 33a and the upper guide holes 32a, 32a of the supporting bracket 30. Between the arms 32 and the outwardly bent portions 33 of the supporting bracket 30, the sliding pins 51, 51 are horizontally welded to the arms 57 of the latch member 50.

As best shown in FIG. 4, the lock plate 60 is of a U-shaped cross-section and rigidly secured longitudinally on the bottom face of the stationary track 13 by rivets 19. On both sides 62, 62 of the lock plate 60, the toothed portions 61, 61 are located in parallel to each other and formed respectively at a predetermined pitch longitudinally along the stationary track 13 to be meshed with the toothed element 53 of the latch member 50. The construction of the movable track 12 and the stationary track 13 is one of conventional types and well known in the art, thus, the explanation is eliminated.

Operation of the above constructed embodiment is explained below in detail. When the seat back $s_2$ of the seat $s$ is conditioned in the position shown in FIG. 1, the rotary member 40 of the locking device 20 is biased by the spring 15 in the counterclockwise direction in the figure to horizontally hold the hand lever 42 in parallel with the movable track 12, as shown in FIG. 2. In this condition, the sliding pins 51, 51 are supported on the horizontal faces 41a of the cam slots 41 of the rotary member 40 and, in turn, the latch member 50 is upwardly biased by the spring 15. Thus, the toothed element 53 of the latch member 50 meshes with the toothed portions 61 of the lock plate 60 to lock the movable track 12 on the stationary track 13.

When it is desired to adjust the position of the seat $s$ occupied by the operator fore and aft, the hand lever 42 is pulled up by the operator against the spring 15 to rotate the rotary member 40 clockwise, as shown in FIG. 3. Thus, the sliding pins 51 drop deeply into the cam slots 41 to retract the latch member 50 downwardly along the upper and lower guide holes 32a and 33a of the supporting bracket 30 and the toothed element 53 of the latch member 50 disengages from the toothed portions 61 of the lock plate 60. This releases the locked condition of the movable track 12 to the stationary track 13 to enable forward or backward adjustments of the seat cushion $s_1$ to a desired position.

After the completion of the desired adjustment of the seat cushion $s_1$, release of the hand lever 42 rotates the rotary member 40 to its original position shown in FIG. 2 due to the biasing force of the spring 15, thereby to upwardly push the sliding pins 51 along the cam faces 41a of the cam slots 41. Subsequently, the latch member 50 is perpendicularly pushed up along the guide holes 32a and 33a to mesh the toothed element 53 with the toothed portions 61 of the lock plate 60, thereby to lock the seat cushion $s_1$ in the selected position. Under this locked condition, the transverse engagement of the toothed element 53 of the latch member 50 with the toothed portions 61 of the lock plate 60 firmly locks the seat cushion $s_1$ on the stationary track 13.

Furthermore, under the locked condition of the locking device 20 as shown in FIG. 2, when the seat back $s_2$ is reclined forwardly by actuation of the reclining device R, the cable 17 is pulled due to movement of the hinge plate 16 of the seat back $s_2$ and, in turn, the rotary member 40 rotates clockwise in the same operation as in the case that the hand lever 42 is pulled up, thereby to automatically release the locked condition of the locking device 20.

Figure 5:
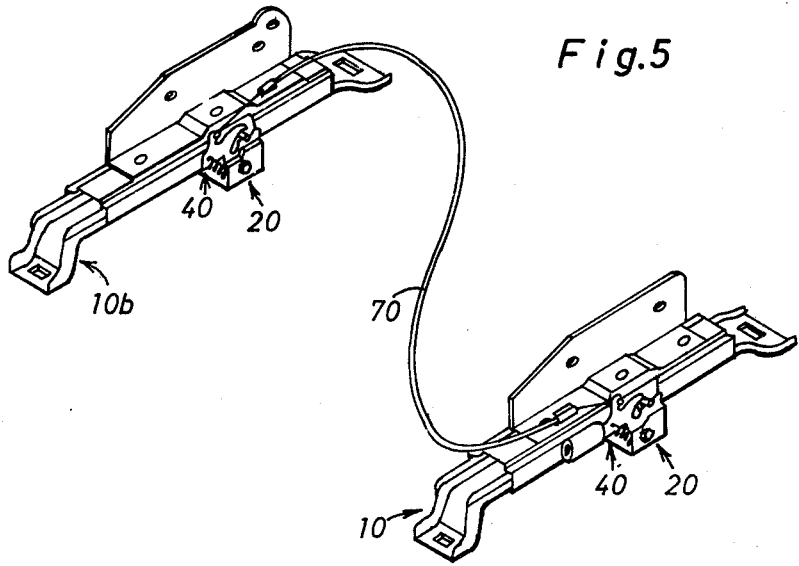
FIG. 5 illustrates a pair of locking devices according to the present invention, which are assembled with a pair of adjustable seat track structures to be adapted to a bench seat for two or three passengers.

In the above described embodiment, although the locking device 20 according to the present invention is applied to a single passenger seat, the locking device 20 may be applied to a bench seat for two or three passengers. In this case, as shown in FIG. 5, a pair of seat track structures 10 and 10b respectively provided with the locking devices 20 are mounted on the bottom portions of both sides of the bench seat, and both rotary members 40 of the locking devices 20 are operatively connected to each other by a flexible cable 70.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A locking device, for an adjustable seat track structure: comprising an elongated stationary track for securement on the floor of a vehicle compartment, a movable track slidably mounted on the stationary track along the longitudinal direction thereof to be locked in a selected position;

an elongated, continuously toothed, lock plate secured to and under said stationary track;

a support member secured on said movable track and including a pair of legs straddling both sides of said stationary track;

a latch member of U-shaped cross-section having its web under said stationary track and its upwardly directed arms slidably guided by said support member for up and down movements toward and away from said lock plate, said latch member being provided with a latch element located under said lock plate to be engaged with a selected portion of the continuous teeth on the lock plate;

an outwardly directed pin secured to each arm of said latch member;

a rotary member having a U-shaped cross-section with upwardly disposed arms, each arm being pivoted to a leg of said support member, the web of said rotary member being located under the latch element of said latch member and each arm of said rotary member being provided with a cam slot engaged with one of said pins of said latch member, said cam slots each including a supporting cam face to support one of said pins thereon and an arcuate cam face to permit upward and downward movement of said pin upon rotary movement of said rotary member;

an operation handle on said rotary member for manual actuation to rotate the rotary member; and resilient means for biasing said rotary member to maintain the engagement of said latch element with said continuous teeth on the lock plate.

2. A locking device for an adjustable seat track structure as claimed in claim 1, wherein each leg of said support member is provided with a pair of vertically aligned openings, said openings slidably receiving an arm of the latch member and serving to guide the latch member in its up and down movements.

3. A locking device for an adjustable seat track structure as claimed in claim 1, wherein said resilient means is a coil spring stretched between a portion of said support member and a portion of said rotary member to bias said rotary member in a direction to hold said latch element engaged with said continuous teeth of said lock plate.

4. A locking device for an adjustable seat track structure as claimed in claim 1, wherein said lock plate is of inverted U-shaped cross-section with two parallel racks of continuous teeth disposed at the bottoms of its legs respectively, said latch element of said latch member having teeth engageable with selected portions of both said racks of continuous teeth.

5. A locking device for an adjustable seat track structure as claimed in claim 4, wherein the individual teeth of the said latch element are elongated and disposed transversely so as to mesh with both said racks of continuous teeth of the lock plate.

* * * * *